Dec. 23, 1952     A. F. HAYEK     2,622,455

TRANSMISSION MECHANISM

Filed Aug. 9, 1951     2 SHEETS—SHEET 1

INVENTOR.
ARTHUR F. HAYEK
BY
ATTORNEY.

Dec. 23, 1952     A. F. HAYEK     2,622,455
TRANSMISSION MECHANISM
Filed Aug. 9, 1951     2 SHEETS—SHEET 2
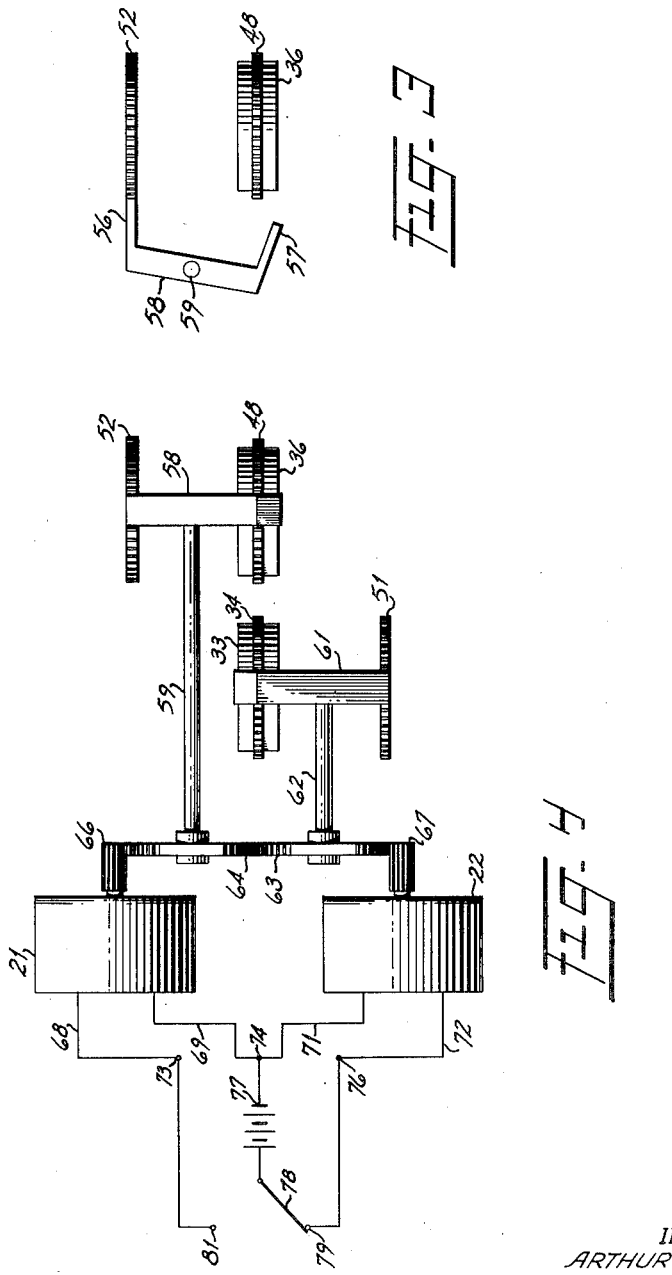
INVENTOR.
ARTHUR F. HAYEK
BY
ATTORNEY Patented Dec. 23, 1952

2,622,455

UNITED STATES PATENT OFFICE 2,622,455

TRANSMISSION MECHANISM

Arthur F. Hayek, Pleasantville, N. Y., assignor to General Precision Laboratory Incorporated, a corporation of New York Application August 9, 1951, Serial No. 241,050

6 Claims. (Cl. 74—675)

This invention relates to a transmission mechanism wherein the interconnections between a pair of input shafts and a pair of output shafts may be reversed. More specifically the instant invention pertains to a transmission mechanism wherein alternate operation of a suitable locking mechanism acts to directly connect or cross connect a pair of input shafts to a pair of output shafts without interrupting the continuous operation of the device.

In computing mechanisms and the like it is frequently desirable to be able to reverse the rotational interrelations between a pair of input shafts and a pair of output shafts in mechanical analogy to the operation of an electrical reversing switch. In the past such reversal of mechanical interconnections has necessitated cumbersome and complicated interclutch arrangements or the enmeshing and unmeshing of gears which necessitates an interruption of operation for at least a short interval of time during switching.

The instant invention has for its purpose the provision of a simple compact arrangement for shifting the interconnection between a pair of inputs and a pair of outputs without interruption of the operation thereof.

Another purpose of the instant invention resides in the provision of an arrangement for positively driving a pair of output shafts by a pair of input shafts through suitable intermeshed gears and for reversing the interconnections between inputs and outputs without requiring a shifting of the intermeshed gears.

In general these objects are attained by the use of four mechanical differential mechanisms so connected together internally as to have four separate external mechanical terminals or shafts. Two of these terminals are selected to serve as inputs and through internal geared interconnections drive the remaining two respective terminals, which serve as outputs. An electrically controlled mechanism is provided to change the internal energy paths from one condition to another condition, while the gears remain in their intermeshed relation and the relationship between the inputs and outputs are interchanged.

The differential mechanisms utilized may be of any of the several well-known types, being characterized only in having three mechanical terminals, such as the spur gear differential, planetary gear spur or bevel differential, differential pulley and differential worm. Any of these types or any other types in which two of the three mechanical terminals can simultaneously serve as input terminals, and also alternatively in which two of the three terminals can simultaneously serve as output terminals, are suitable for use in this invention.

A further understanding of the invention may be had from the detailed description and accompanying drawings, in which:

Figure 3 is a detail view of the detent mechanism used in connection with the invention.

Figure 4 is a plan view of the detent mechanism and associated operative mechanism omitting the intergear relationships of Fig. 1 for the sake of clarity of illustration.

Figure 1:
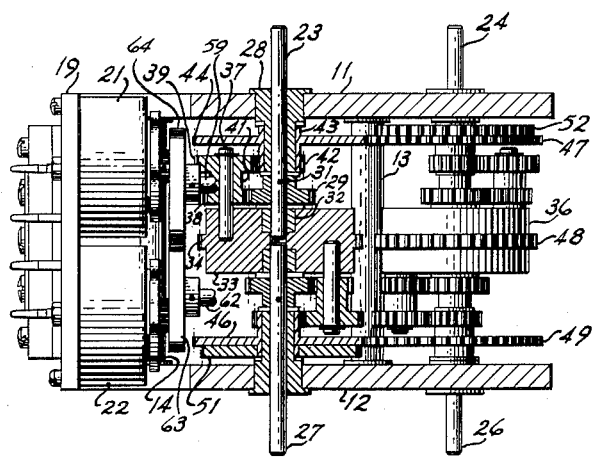
Figure 1 is a plan view of the transmission mechanism of the invention, partly in section taken on the line 1—1 of Fig. 2.
Figure 2:
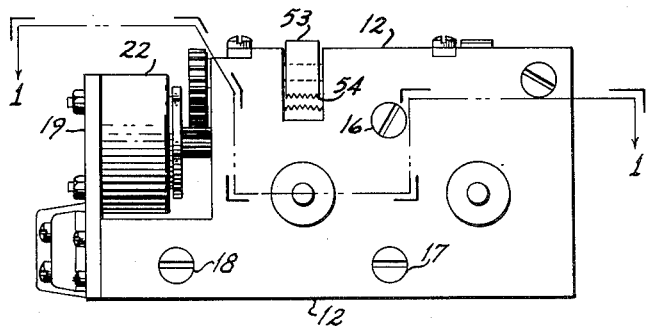
Figure 2 is an elevation view of the transmission mechanism of the invention.

Referring now to Figs. 1 and 2 a frame for supporting and enclosing the mechanism is composed of a pair of side plates 11 and 12 having an end plate 19 fastened thereto and being further braced and interconnected by spaced transversely extending rod numbers such as 13 and 14 fastened to the side plates by suitable threaded fastenings such as 17 and 18. A pair of rotary solenoids 21 and 22 are fastened to and carried by the end plate 19 and serve as the transmission switching controls as will become more apparent hereinafter.

The side plates 11 and 12 serve as supports for four interconnected spur gear planetary differential mechanisms, each of which has one mechanical terminal brought out in the form of a rotatable shaft. These four shafts are designated 23, 24, 26 and 27 in Fig. 1, and are desigend to constitute the two input terminals and the two output terminals of the transmission mechanism.

The shaft 23 is journalled in a bearing 28 in the side plate 11 and drives a pinion 29 secured to the shaft 23 by a pin 31. The interior end of the shaft 23 is fitted into an axial bearing 32 in a short solid cylinder or disc 33. This disc 33 is provided at its mid circumference with a band of triangular shaped teeth 34, this form of tooth being suitable for use in a positive locking mechanism. These teeth are more clearly seen in the non-sectional view of the similar disc 36. A pin 37 is press-fitted into the disc 33 near its edge and rotatably supports an integral pair of pinions 38 and 39 which together constitute an idler gear 41. The smaller diameter pinion 38 of this idler 41 meshes with the pinion 29. The larger diameter pinion 39 of the idler meshes with a pinion 42 secured to a hub 43 rotatably borne on the bearing 28. The same hub 43 also carries an integral gear 44.

The mechanism thus far described constitutes a complete differential having three mechanical terminals, consisting of, the gear 44, the shaft 23 and the disc 33. When any one of these terminals is locked against rotation, torque applied to either of the other terminals causes rotation of the third terminal.

The other three differentials incorporated in the mechanism are similar to the one just described, so that detailed descriptions would be superfluous. One of these differentials has as external mechanical terminal the shaft 27 and the other two terminals being constituted by the gear 46 and the cylinder or disc 33. The latter terminal is the same as one terminal of the previously described differential, the disc 33 thus serving as a common terminal for both differential mechanisms.

Of the two remaining differentials one is provided with the external terminal shaft 24, the terminal gear 47 and the disc 36 carrying toothed band 48. The other differential is provided with the external terminal shaft 26, the terminal gear 49 and the disc 36, the latter being shared in common with the last-mentioned differential.

The terminal gears 44 and 47 are intermeshed and likewise the terminal gears 46 and 49 are also intermeshed. Thus the four differentials are interconnected by these four terminal gears and by the two discs 33 and 36, each serving at one and the same time as a terminal of two different differentials.

The terminal gear 47 is secured to a detent wheel 52 provided around its circumference with triangular-shaped teeth and the terminal gear 46 is similarly secured to a similar detent wheel 51. These two detent wheels together with the detent bands 34 and 48 surrounding the discs 33 and 36 serve to control the torque transmission paths between the input and output terminals.

Associated with each detent wheel and band there is provided a detent one of which is depicted at 53 in Fig. 2. This detent is provided with triangular-shaped teeth 54 which are designed to engage the similar teeth on the detent wheel 51 to lock the detent wheel and prevent it from rotating. Because the detent wheel 51 is secured rigidly to the terminal gear 46, this action also immobilizes the latter.

Each detent is carried by a rocker bar as illustrated in Fig. 3, in which the detent wheel 52 is engaged by the detent 56. This detent 56 and the detent 57 are carried by opposite ends of the rocker 58 and constitute integral parts thereof. The rocker 58 is mounted on the end of a rock shaft 59, so that rotation of this shaft 59 will engage and disengage the detent 56 with the detent wheel 52. At the same time this rotation of the shaft 59 results in disengagement and engagement of the band 48 mounted on the disc 36 by the detent 57.

The rocker 58 is also depicted in plan in Fig. 4, and a second rocker 61, similarly constructed and carrying two similar detents also is depicted associated with the detent band 34 on the disc 33 and with the detent wheel 51, the rocker 61 being secured to and actuated by the rock shaft 62.

The shaft 62 is secured to the hub of a gear 63, and the shaft 59 is similarly secured to the hub of a similar gear 64. These two gears 64 and 63 are intermeshed and also mesh with respective pinions 66 and 67. The pinions 66 and 67 are secured to the shafts of the rotary solenoids 21 and 22, respectively, these solenoids and pinions being depicted in Fig. 4 as being spaced for clarity so that the pinions 66 and 67 engage the gears 64 and 63 at diametrically opposite points. In actual practice, however, the pinions 66 and 67 engage their respective gears at nearly similar points on the same sides thereof as illustrated in Fig. 1, thus permitting compact assembly of the rotary solenoids on their supporting plate 19.

The gears 63 and 64 may be segmental in form, such shape being permissible because the required rotational displacement is small and is desirable to save space.

The four solenoid terminal conductors 68, 69, 71 and 72 are connected to three terminals 73, 74 and 76. These terminals are connected to any suitable electrical circuit for alternately actuating the solenoids 21 and 22. Such an electrical circuit is here basically and schematically represented by a battery 77 and a two-position switch 78 having alternate contacts 79 and 81. When this switch 78 engages the contact 79 the rotary solenoid 22 is energized and its pinion 67 is thereby rotated so as to rotate the gears 64 and 63, causing the rocker arm 58 to rotate and to bring one of its detents 57 into engagement with the detent band 48 of the disc 36, locking it and preventing it from turning. The same action of the rotary solenoid 22 also causes the rocker arm 61 to rotate to immobilize the detent band 34 and its detent disc 33. When the switch 78 is moved to engage contact 81 the rotary solenoid 21 is energized, which in turn rotates both rocker arms 58 and 61 in the opposite directions to engage the detent wheels 52 and 51, releasing the discs 33 and 36. These two positions of the rotary solenoids control the internal conditions of the transmission mechanism and determine the dynamic paths between the input shafts and the output shafts.

Referring to Fig. 1, the shafts 23 and 26 may be utilized as input shafts and the shafts 24 and 27 as output shafts, or alternatively the shafts 24 and 27 may constitute input shafts, with the shafts 23 and 26 as output shafts. No changes in the transmission mechanism need be made to effect this change, it being merely a matter of selecting the desired function for each pair of shafts.

In operation, let it be assumed that input torques are applied to the shafts 24 and 27, Fig. 1, and that switch 78, Fig. 4, engages contact 79. The rocker arm 61 is then so rotated as to engage and lock the disc 33 against rotation and the rocker arm 58 is rotated to engage and lock the disc 36 against rotation. Consequently torque applied to the shaft 27, Fig. 1, rotates gear 46 and the meshed gear 49. Because the disc 36 is locked this action can result only in rotation of the output shaft 26. Likewise torque applied to the input shaft 24 rotates the gear 47 and the meshed gear 44, and as the disc 33 is locked, the result is a rotation of the output shaft 23. Thus torque applied to the shaft 27 is transmitted only to shaft 26, and torque applied to shaft 24 is transmitted only to shaft 23.

When the switch 78, Fig. 4, is shifted to contact 81, the rotary switch 21 is energized which rotates rocker arm 58 to engage and lock detent wheel 52, releasing the disc 36, and rotates rocker arm 61 to engage and lock the detent wheel 51, releasing disc 33. If then torque be applied to the input shaft 27, Fig. 1, the gear 46 being locked through its connection with the detent wheel 51, the torque is communicated to the disc 33. Likewise since the gear 44 is locked due to its mesh with the gear 47 which in turn is locked through the detent wheel 52, this can result only in the transmission of torque to the output shaft 23. Likewise, torque applied to the shaft 24 must result in the application of torque to the disc 36 since the gear 47 is locked against rotation, and torque on the disc 36 in turn can result only in the application of torque to the output shaft 26, the gear 49 being locked through its meshing with the gear 46. Thus torque applied to the shaft 27 is transmitted only to shaft 23 and torque applied to shaft 24 is transmitted only to shaft 26.

What is claimed is:

1. A transmission mechanism comprising, a pair of output shafts, a first input, differential means operated thereby, a first torque transmission means interconnecting said differential means to one of said output shafts, a second torque transmission means interconnecting said differential means and the other of said output shafts, a second input, differential means operated thereby, a third torque transmission means interconnecting said second mentioned differential means and said one output shaft, a fourth torque transmission means interconnecting said second mentioned differential means and said other output shaft, and means for simultaneously locking said first and fourth transmission interconnecting means and alternately simultaneously locking said second and third transmission interconnecting means.

2. A transmission mechanism comprising, four differential mechanisms each of which includes three torque transmission terminals, torque transmitting members interconnecting respective pairs of said torque transmission terminals in a four arm mechanical bridge network, each of said differential mechanisms constituting an arm thereof, an input shaft connected to the remaining torque transmission terminal of one of said differential mechanisms, a second input shaft connected to the remaining torque transmission terminal of the diagonally opposite differential mechanism, an output shaft connected to the remaining torque transmission terminal of one of the remaining differential mechanisms, and means for alternately and selectively preventing rotation of opposite torque transmitting members.

3. A transmission mechanism as defined in claim 2 in which a second output shaft is connected to the remaining torque transmission terminal of the other of the remaining differential mechanisms.

4. A transmission mechanism comprising, a first differential mechanism, a first input shaft operatively connected thereto, a second differential mechanism, a second input shaft operatively connected thereto, a third differential mechanism, an output shaft connected thereto, first torque transmission means interconnecting an output of said first differential mechanism and said third differential mechanism, second torque transmission means interconnecting an output of said second differential and said third differential mechanism, a fourth differential mechanism, an output shaft connected thereto, third torque transmission means interconnecting another output of said first differential mechanism and said fourth differential mechanism, fourth torque transmission means interconnecting another output of said second differential mechanism and said fourth differential mechanism, means for simultaneously preventing operation of said first and fourth torque transmission means and alternately preventing operation of said second and third torque transmission means.

5. A transmission mechanism comprising, first and second differential mechanisms each of which has an input and a pair of outputs, a pair of input shafts connected respectively to the inputs of said first and second differential mechanisms, a third differential mechanism having an output terminal and a pair of input terminals one of said input terminals being common to one output terminal of said first differential mechanism and the other of said input terminals being common to one output terminal of said second differential mechanism, a fourth differential mechanism having an output terminal and a pair of input terminals, one of said input terminals being common to the other output terminal of said first differential mechanism and the other of said input terminals being common to the other output terminal of said second differential mechanism, a pair of output shafts connected respectively to the outputs of said third and fourth differential mechanisms, and shiftable means for inhibiting operation of the common terminal of said first and third and the common terminal of said second and fourth differential mechanisms and for alternately and selectively inhibiting the operation of the common terminal of said first and fourth and the common terminal of said second and third differential mechanisms.

6. A transmission mechanism comprising, a first pair of three terminal differential gears having a terminal in common, a second pair of three terminal differential gears having a terminal in common, a first drive means interconnecting a noncommon terminal of said first pair of differential gears with a noncommon terminal of said second pair of differential gears, second drive means interconnecting another noncommon terminal of said first pair of differential gears with another noncommon terminal of said second pair of differential gears, a first input shaft connected to one remaining terminal of said first pair of differential gears, a first output shaft connected to the other remaining terminal of said first pair of differential gears, a second input shaft connected to one remaining terminal of said second pair of differential gears, a second output shaft connected to the other remaining terminal of said second pair of differential gears, and means for alternately and selectively inhibiting operation of the common terminals of said differential gears and the drive means interconnecting said pairs of differential gears.

ARTHUR F. HAYEK.

REFERENCES CITED

The following references are of record in the file of this patent:

UNITED STATES PATENTS

| Number | Name | Date |
| --- | --- | --- |
| 743,467 | Decker | Nov. 10, 1903 |
| 1,130,054 | Barnum | Mar. 2, 1915 |
| 1,460,958 | Gahlert | July 3, 1923 |
| 1,837,897 | Crocker | Dec. 22, 1931 |
| 2,007,577 | Lum | July 9, 1935 |
| 2,462,846 | Clark | Mar. 1, 1949 |

FOREIGN PATENTS

| Number | Country | Date |
| --- | --- | --- |
| 121,880 | Austria | Nov. 15, 1930 |
| 907,528 | France | Mar. 14, 1946 |